United States Patent [19]

Huver et al.

[11] Patent Number: 5,744,543
[45] Date of Patent: Apr. 28, 1998

[54] ONE-COMPONENT REACTIVE ADHESIVE

[75] Inventors: Thomas Huver; Herbert Fischer, both of Duesseldorf; Wolfgang Klauck, Meerbusch; Gerd Bolte, Monheim, all of Germany

[73] Assignee: Henkel Kommanditgesellschaft auf Aktien, Duesseldorf, Germany

[21] Appl. No.: 750,426

[22] PCT Filed: May 30, 1995

[86] PCT No.: PCT/EP95/02047

§ 371 Date: Dec. 9, 1996

§ 102(e) Date: Dec. 9, 1996

[87] PCT Pub. No.: WO95/33800

PCT Pub. Date: Dec. 14, 1995

[30] Foreign Application Priority Data

Jun. 9, 1994 [DE] Germany .................. 44 20 151.6

[51] Int. Cl.$^6$ .................................................. C08K 5/20
[52] U.S. Cl. ........................... 524/728; 526/204; 526/217
[58] Field of Search ........................... 524/728; 526/204, 526/217

[56] References Cited

U.S. PATENT DOCUMENTS

| | | | |
|---|---|---|---|
| 4,676,858 | 6/1987 | Ritter | 156/307.3 |
| 4,778,845 | 10/1988 | Tschan et al. | 524/728 |
| 4,857,623 | 8/1989 | Emmerling et al. | 528/28 |
| 5,209,969 | 5/1993 | Crowther | 524/728 |
| 5,268,436 | 12/1993 | Huver et al. | 526/216 |
| 5,342,867 | 8/1994 | Ryan et al. | 524/728 |
| 5,354,821 | 10/1994 | Huver et al. | 526/147 |
| 5,434,230 | 7/1995 | Huver et al. | 526/219.2 |
| 5,525,654 | 6/1996 | Podola et al. | 524/199 |
| 5,554,709 | 9/1996 | Emmerling et al. | 528/27 |

FOREIGN PATENT DOCUMENTS

| | | |
|---|---|---|
| 078 994 | 5/1983 | European Pat. Off. . |
| 261 409 | 3/1988 | European Pat. Off. . |
| 356 875 | 3/1990 | European Pat. Off. . |
| 502 773 | 9/1992 | European Pat. Off. . |
| 611 813 | 8/1994 | European Pat. Off. . |
| 36 29 237 | 3/1988 | Germany . |
| 38 29 438 | 3/1990 | Germany . |
| 38 29 461 | 4/1990 | Germany . |
| 40 21 505 | 2/1991 | Germany . |
| 40 00 776 | 7/1991 | Germany . |
| 40 29 504 | 3/1992 | Germany . |
| 40 29 505 | 3/1992 | Germany . |
| 41 23 194 | 1/1993 | Germany . |
| 43 30 354 | 3/1995 | Germany . |
| 44 41 414 | 6/1995 | Germany . |
| 44 41 463 | 6/1995 | Germany . |

Primary Examiner—Joseph L. Schofer
Assistant Examiner—N. Sarofim
Attorney, Agent, or Firm—Ernest G. Szoke; Wayne C. Jaeschke; Martin G. Meder

[57] ABSTRACT

Described is a single-component adhesive made from a radical-polymerized olefinically unsaturated monomer and an air-activated initiator system and characterized in that the adhesive also contains isocyanate and/or silane groups. This makes a dual curing mechanism possible. The more rapid of the two curing reactions gives specific characteristics in the initial stage, e. g. high initial strength, high adhesive strength or high contact strength. The slower of the two reactions produces the definitive characteristics, e.g. final strength or resistance to heat.

29 Claims, No Drawings

ONE-COMPONENT REACTIVE ADHESIVE

FIELD OF THE INVENTION

This invention relates to a one-component reactive adhesive based on an aerobic adhesive.

DISCUSSION OF RELATED ART

Aerobic adhesives are known. Thus, DE 38 29 438 and DE 38 29 461, for example, describe ethylenically unsaturated polymerizable compounds which polymerize on exposure to oxygen through the presence of a certain activator system. The activator system consists of N-alkyl-substituted tertiary aryl amines containing at least one aliphatic CH bond in the α-position, for example dimethyl aniline or dimethyl-p-toluidine, a metal compound soluble in the system to accelerate the drying of unsaturated oils and a carboxylic acid with a pKs value of 0.9 to 7. Preferred drying agents are metal compounds which occur in several valency stages, more particularly metal compounds of cobalt, manganese or iron. The carboxylic acids are monomeric or polymeric carboxylic acids, preferably ethylenically unsaturated monocarboxylic or dicarboxylic acids, such as acrylic acid, methacrylic acid and maleic acid. The free carboxylic acid may be replaced by a hydrolyzable derivative, for example an anhydride.

DE-OSS 40 00 776 and 41 23 194 describe radical-polymerizable multicomponent mixtures of olefinically unsaturated compounds which contain hydrazones as initiators and which are stable in storage in the absence of air. The main component of the initiator consists of alkyl, cycloalkyl or aryl hydrazones of aliphatic, cycloaliphatic or aromatic aldehydes or ketones which are capable of forming hydroperoxides. The initiator system preferably also contains soluble metal compounds of the type used for drying unsaturated oils, for example compounds of copper or manganese, more particularly divalent or trivalent iron. Reducing agents with an accelerating effect on the radical polymerization, for example hydroxy ketones, may also be present.

DE 43 30 354 describes radical-polymerizable compositions of olefinically unsaturated compounds which polymerize on exposure to air through the presence of certain furanones. In their case, too, soluble metal compounds, more particularly iron, cobalt and manganese, act as activator.

Other aerobic adhesives containing dihydropyridines in the initiator system are described in patent applications IE 91/741 and IE 91/742 in the name of Loctite.

These known aerobic adhesives form effective bonds in a short time. However, there are also applications which require relatively high strength both at the beginning of bonding and after curing.

Accordingly, the problem addressed by the present invention was to raise the property level of aerobic adhesives, more particularly in regard to ultimate strength, but also in regard to early strength.

DESCRIPTION OF THE INVENTION

The solution provided by the invention is defined in the claims and is essentially characterized in that the adhesive contains isocyanate and/or silane groups as further active groups. These additional functional groups may either be directly chemically attached to the radical-polymerizable olefinically unsaturated monomers or may form independent compounds. In the latter case, the compounds in question are known from one-component polyurethane adhesives. These are moisture-crosslinking systems of polyisocyanates which are normally produced from polyols of relatively high molecular weight with more than the stoichiometric quantity of isocyanate (so-called isocyanate polyurethanes). It is also known that corresponding polyisocyanate compounds can be reacted with alkoxysilane compounds to form alkoxysilane-terminated polyurethanes. The NCO groups may be more or less completely replaced by silane groups. Monomers such as these and their use in reactive adhesives are known.

Alkoxysilane-terminated moisture-curing polyurethanes are described, for example, in DE 36 29 237. They are produced by initially reacting OH-terminated diols and/or triols with diisocyanates to form NCO-terminated polyurethanes with an NCO functionality of at least 2. Some of the NCO groups in aliphatic alcohols are then reacted to form a polyurethane with an NCO functionality of at least 1 and less than 2. Finally, the remaining NCO groups are reacted with aminoalkyl, mercaptoalkyl or epoxyalkyl alkoxysilanes.

Corresponding moisture-curing alkoxysilane-terminated polyurethanes are also the subject of DE 40 21 505. The silane compounds correspond to the following general formula:

$$X\text{-}(CH_2)_n\text{-}Si(R)\text{-}(OR^1)_2 \qquad (I)$$

in which

X is a secondary amino group or an alkoxy group containing 1 to 10 carbon atoms. Preferred compounds are (β-aminoethyl)-trimethoxysilane, (γ-aminopropyl)-trimethoxysilane, (β-aminoethyl)-methyl dimethoxysilane, (γ-aminopropyl)-methyl dimethoxysilane, (β-aminopropyl)-triethoxysilane, (γ-aminopropyl)-triethoxysilane, (β-aminoethyl)-methyl diethoxysilane and (γ-aminopropyl)-methyl diethoxysilane.

Further particulars of the polyols, polyisocyanates and their reaction to form the alkoxysilane-terminated polyurethanes can be found in the cited DE-OSS 40 29 505 and 40 29 504. Their relevant contents are hereby specifically included as part of the disclosure of the present application.

The radical-polymerizable olefinically unsaturated monomers are also known (cf. for example the documents cited as prior art and DE 43 40 239 and DE 43 40 095). The monomers in question are essentially acrylate or methacrylate compounds, acrylonitrile and styrene and derivatives thereof. Besides the low molecular weight monomers, relatively high molecular weight monomers formed by a polyreaction, for example acryl-terminated polyesters, are also suitable. Acrylic acid or methacrylic acid and derivatives thereof, such as esters and amides are preferred.

To obtain contact adhesive properties, acrylates are particularly preferred. Providing suitable monomers are used, a layer with contact adhesive properties is obtained.

When selecting the particular components from the group of radical-polymerizable monomers, air-activatable initiator systems, isocyanate and silane compounds, stability in storage must of course be taken into account. Thus, where hydrazone initiators are combined with isocyanate post-curing, only tertiary aliphatic isocyanates, for example reaction products of TMXDI, should be used. No such limitation applies to the other initiator systems containing no active hydrogen.

The additives, for example stabilizers, auxiliaries and fillers, have to be selected with equal care. The selection rules are familiar to the adhesives chemist. This applies in particular to catalysts for the NCO or silane post-curing, for example Sn compounds.

It is possible in this way to produce storable one-component reactive adhesives which cure through two different chemical reactions taking place at different times. A certain desired provisional property profile is obtained through the faster reaction. The slower second reaction (post-cure) distinctly increases the property level. This applies in particular to ultimate strength, heat resistance, solvent resistance and water resistance. Stability in storage amounts to >2 months. It was determined by measuring the viscosity of the formulations.

Where the two cure mechanisms are combined, strength is surprisingly built up more quickly than when the post-curing component is used on its own.

The invention is illustrated by the following Examples.

I. Production of the prepolymers

EXAMPLE 1

In a one-liter three-necked flask equipped with a KPG stirrer, internal thermometer and reflux condenser, 220 g (0.4 mole) of CAPA 305 (polycaprolactone triol manufactured by Solvay) and 293 g (1.2 moles) of 1,3-bis-(1-isocyanato-1-methylethyl)-benzene (TMXDI, aliphatic diisocyanate manufactured by American Cyanamide) are mixed under nitrogen and heated for 2 h to 110° C. until the theoretical NCO content of 9.83% is reached.

EXAMPLE 2

In the reactor described in 1.),616 g (0.15 mole) of PPU 2404 (macrotriol based on propylene oxide manufactured by DOW) and 110 g (0.45 mole) of TMXDI are mixed and heated to 110° C. After 1 h, 0.05% of dibutyl tin dilaurate (DBTL) is added and the reaction mixture is heated for another 2 h until the theoretical NCO content of 2.6% is reached.

EXAMPLE 3

In the reactor described in 1.), 275 g (0.8 mole) of Dianol 320 (propoxylated bisphenol A manufactured by Akzo) and 293 g (1.2 mole) of TMXDI are mixed and heated to 100° C. After 1 h, 0.05% of DBTL is added and the reaction mixture is heated until the theoretical NCO content of 5.9% is reached.

EXAMPLE 4

In the reactor described in 1.), 200 g (0.1 mole) of PTHF 2000 (polytetrahydrofurfuryl diol manufactured by BASF) are heated to 80° C. 35 g (0.2 mole) of 2,4-toluene diisocyanate (Desmodur T 100, a product of Bayer AG) and 0.01% of DBTL are then added and the mixture is heated until the theoretical NCO content of 3.58% is reached. 35.4 g (0.198 mole) of 3-aminopropyl trimethoxysilane are then added and the mixture is heated until the NCO content is <0.1%.

EXAMPLE 5

In the reactor described in Example 1.), 390 g (1.6 moles) of TMXDI and 186 g (1.6 moles) of 2-hydroxyethyl acrylate are mixed and heated to 85° C. until the NCO content has reached the theoretical value of 11.7%.

II. Adhesive formulations (P=Parts by Weight)

EXAMPLE 6

50 P silane-terminated prepolymer of Example 4
40 P methyl methacrylate
10 P Methacrylic acid
5 P DHP (dihydropyridine)
350 ppm Fe (acac)$_3$ (=acetyl acetonate)

EXAMPLE 7

50 P silane-terminated prepolymer of Example 4
50 P hydroxypropyl methacrylate
4 P acetophenone-t-butyl hydrazone
1.2 P Fe (acac)$_3$
750 ppm I$_2$

EXAMPLE 8

50 P NCO-containing prepolymer of Example 1
50 P benzyl methacrylate
4 P acetophenone-t-butyl hydrazone
1.2 P Fe (acac)$_3$
750 ppm I$_2$

EXAMPLE 9

38.5 P Dynacoll A 3151 (acryl-terminated polyester manufactured by Hüls)
38.5 P n-butyl acrylate
23 P NCO-containing prepolymer of Example 1
4 P acetophenone-t-butyl hydrazone
1.2 P Fe (acac)$_3$
750 ppm I$_2$

EXAMPLE 10

38.5 P Dynacoll A 3151 (acryl-terminated polyester manufactured by Hüls)
38.5 P n-butyl acrylate
23 P NCO-containing prepolymer of Example 2
4 P acetophenone-t-butyl hydrazone
1.2 P Fe (acac)$_3$
750 ppm I$_2$

EXAMPLE 11

38.5 P Dynacoll A 3151 (acryl-terminated polyester manufactured by Hüls)
38.5 P n-butyl acrylate
23 P NCO-containing prepolymer of Example 3
4 P acetophenone-t-butyl hydrazone
1.2 P Fe (acac)$_3$
750 ppm I$_2$

EXAMPLE 12

38.5 P Dynacoll A 3151
38.5 P phenoxyethyl acrylate
23 P NCO-containing prepolymer of Example 2
4 P acetophenone-t-butyl hydrazone
1.2 P Fe(acac)$_3$
750 ppm I$_2$

EXAMPLE 13

20 P Dynacoll A 3151
50 P n-butyl acrylate
30 P silane-containing prepolymer of Example 4

4 P acetophenone-t-butyl hydrazone
1.2 P Fe(acac)$_3$
750 ppm I$_2$

EXAMPLE 14

30 P Dynacoll A 3151
50 P n-butyl acrylate
20 P silane-containing prepolymer of Example 4
5 P 1-phenyl-2-propyl-3,5-diethyl-1,2-dihydropyridine
5 P methacrylic acid
50 ppm Fe(acac)$_3$

EXAMPLE 15

26 P Dynacoll A 3151
26 P Prepolymer of Example 1
30 P n-butyl acrylate
17.5 P NCO-functional monomer of Example 5
4 P acetophenone-t-butyl hydrazone
1.2 P Fe(acac)$_3$
750 ppm I$_2$ Comparison Examples

EXAMPLE 16 (aerobic component only)

50 P Dynacoll A 3151
50 P n-butyl acrylate
4 P Fe(acac)$_3$
750 ppm I$_2$

EXAMPLE 17 (NCO prepolymer only)

Bonding is carried out using the prepolymer of Example 1 as a moisture-curing one-component polyurethane adhesive.

III. General procedure for the production of adhesive formulations

The monomer is introduced into a nitrogen-filled multiple-necked flask and the inhibiting stabilizer, the metal compound and any additives necessary are dissolved therein in the absence of oxygen and moisture. The NCO prepolymer or silane-functional prepolymer is then introduced and the solution is homogenized. The homogeneous mixture is cooled to −196° C., the flask is evacuated to 0.5 torr and subsequently heated to room temperature. Remaining oxygen is removed from the system by repeating this freezing/thawing cycle several times. The oxygen-sensitive initiator component is then added and the system is degassed in the same way as before. The mixture is stored in an inert gas atmosphere.

IV. Tests

The specimens were produced by knife-coating the adhesive onto the test specimen in a thickness of 100 µm. After an air contact time of 20 minutes, the parts to be bonded were fitted together and subjected to a pressure of 70 N/mm$^2$ for 30 seconds. After the curing time shown, tensile strength and surface tackiness were tested. To this end, the adhesive was knife-coated onto a PVC plate in a thickness of 100 pm and evaluated by touch after exposure to air (+=tack,−=no tack).

The tensile shear strengths were determined in accordance with DIN 53281 on test specimens with a one-cut overlap (250 mm$^2$) and are expressed in N/mm$^2$.

The results obtained are set out in the following Tables:

TABLE 1

| Example | Tensile Shear Strength (Fe/Fe) | |
| --- | --- | --- |
| | After 24 h | After 10 d |
| 6 | 10.5 | 12.2 |
| 7 | 11.7 | 12.5 |
| 8 | 7.6 | 10.1 |

TABLE 2

| Example | Tensile Shear Strength (Wood/Wood) | | Tack | |
| --- | --- | --- | --- | --- |
| | Immediately | After 1 d | After 1 h | After 1 d |
| 9 | 0.1 | 1.1 | + | − |
| 10 | 0.1 | 0.6 | + | − |
| 11 | 0.1 | 2.6 | + | − |

TABLE 3

| Example | Tensile Shear Strength (Wood/Wood) | |
| --- | --- | --- |
| | Immediately | After 7 Days |
| 11 | 0.8 | 2.6 |
| 12 | 0.9 | 3.2 |
| 13 | 0.5 | 3.0 |
| 14 | 0.2 | 2.4 |
| 15 | 0.3 | 6.3 |
| 16 | 0.2 | 0.2 |
| 17 | 0 | 1.5 |

What is claimed is:

1. A one-component reactive adhesive based on an air-activatable initiator wherein the air-activatable initiator is selected from the group consisting of hydrazones, dihydropyridines and mixtures thereof and radical-polymerizable olefinically unsaturated monomers, wherein the adhesive additionally contains groups selected from the group consisting of isocyanate, silanes and mixtures thereof.

2. The one-component reactive adhesive composition of claim 1, comprising the product of combining:

an air-activatable initiator wherein the air-activatable initiator is selected from the group consisting of hydrazones, dihydropyridines and mixtures thereof;

a moisture-curing prepolymer adhesive terminated with groups selected from the group consisting of isocyanates, silanes and mixtures thereof; and radical-polymerizable olefinically unsaturated monomers.

3. The reactive adhesive of claim 1, wherein the hydrazone is acetophenone-t-butyl hydrazone.

4. The reactive adhesive of claim 1, wherein the dihydropyridine is selected from the group consisting of dihydropyridine, 1-phenyl-2-propyl-3,5-diethyl-1,2-dihydropyridine and mixtures thereof.

5. The reactive adhesive of claim 2, wherein the moisture-curing prepolymer is selected from the group consisting of isocyanate terminated diols, isocyanate terminated triols, isocyanate acrylates and mixtures thereof.

6. The reactive adhesive of claim 6, wherein the isocyanate terminated diol prepolymer is an isocyanate terminated polyether diol prepolymer.

7. The reactive adhesive of claim 6, wherein the isocyanate terminated polyether diol prepolymer is the reaction product of 1,3-bis-(1-isocyanato-1-methylethyl)-benzene and propoxylated bisphenol A.

8. The reactive adhesive of claim 5, wherein the isocyanate terminated triol is selected from the group consisting of the reaction product of 1,3-bis-(1-isocyanato-1-methylethyl)-benzene and polycaprolactam triol, the reaction product of 1,3-bis-(1-isocyanato-1-methylethyl)-benzene and propylene oxide macrotriol and mixtures thereof.

9. The reactive adhesive of claim 5, wherein the isocyanate acrylate prepolymer is the reaction product of 1,3-bis4(1-isocyanato-1-methylethyl)7benzene and 2-hydroxyethyl acrylate.

10. The reactive adhesive of claim 2, wherein the moisture-curing prepolymer is selected from the group consisting of alkoxysilane terminated diols, alkylalkoxysilane terminated diols, alkoxysilane terminated triols, alkylalkoxy terminated triols and mixtures thereof.

11. The reactive adhesive of claim 10, wherein the alkoxysilane terminated diol is the reaction product of polytetrahydrofurfuryl diol, toluenediisocyanate and 3-aminopropyl trimethoxysilane.

12. The reactive adhesive of claim 2, wherein the radical-polymerizable olefinically unsaturated monomers are selected from the group consisting of acrylic acid, methacrylic acid, derivatives of acrylic acid, derivatives of methacrylic acid, acryl-terminated polyesters and mixtures thereof.

13. The reactive adhesive of claim 12, wherein the derivatives of acrylic acid are selected from the group consisting of esters containing from about 1 to about 25 carbon atoms, amides containing from about 1 to about 25 carbon atoms and mixtures thereof.

14. The reactive adhesive of claim 12, wherein the derivatives of acrylic acid are selected from the group consisting of n-butyl acrylate, phenoxyethyl acrylate and mixtures thereof.

15. The reactive adhesive of claim 12, wherein the derivatives of methacrylic acid are selected from the group consisting of esters containing from about 1 to about 25 carbon atoms, amides containing from about 1 to about 25 carbon atoms and mixtures thereof.

16. The reactive adhesive of claim 12, wherein the derivatives of methacrylic acid are selected from the group consisting of methyl methacrylate, hydroxypropyl methacrylate and mixtures thereof.

17. The reactive adhesive of claim 2, further comprising at least one stabilizer.

18. The reactive adhesive of claim 2, further comprising at least one filler.

19. The reactive adhesive of claim 2, further comprising at least one catalyst.

20. The reactive adhesive of claim 19, wherein the catalyst is selected from the group consisting of tin compounds, ferric acetylacetonate, iodine and mixtures thereof.

21. The reactive adhesive of claim 19, wherein the catalyst is dibutyl tin dilaurate.

22. The reactive adhesive of claim 26, which comprises:
about 26 parts by weight acryl-terminated polyester;
about 26 parts by weight of the reaction product of 1,3-bis-(1-isocyanato-1-methylethyl)-benzene and polycaprolactam triol;
about 30 parts by weight n-butyl acrylate;
about 17.5 parts by weight of the reaction product of 1,3-bis-(1-isocyanato-1-methylethyl)-benzene and 2-hydroxyethyl acrylate;
about 4 parts by weight acetophenone-t-butyl hydrazone;
about 1.2 parts by weight Fe(acac)$_3$; and
about 750 ppm I$_2$.

23. The reactive adhesive of claim 2, which comprises the reaction product of:
about 0.2 to about 15% by weight of an air-activatable initiator wherein the air-activatable initiator is selected from the group consisting of hydrazones, dihydropyridines and mixtures thereof;
about 20 to about 99.6% by weight of radical-polymerizable monomers; and
about 0.2 to about 10% by weight of prepolymer termination groups selected from the group consisting of isocyanates, silanes-and mixtures thereof.

24. The reactive adhesive of claim 23, further comprising about 0.01% to about 50% by weight by weight of additives, based on the adhesive as a whole.

25. In a process for bonding, wherein the improvement comprises use of the reactive adhesive of claim 2.

26. A one-component reactive adhesive composition comprising the reaction product of:
about 1 to about 10% by weight of an air-activatable initiator wherein the air-activatable initiator is selected from the group consisting of hydrazones, dihydropyridines and mixtures thereof;
about 40 to about 80% by weight of radical-polymerizable monomers;
about 1 to about 7% by weight of prepolymer termination groups selected from the group consisting of isocyanates, silanes and mixtures thereof; and
about 0.01 to about 40% by weight of additives, based on the adhesive as a whole.

27. A process for making one-part moisture and air-cure adhesives, which comprises the steps of:
introducing monomer, moisture-curing prepolymer, stabilizer and all additives but for an oxygen-sensitive initiator component, which comprise a mixture, into an inert gas-filled container;
homogenizing the mixture;
cooling the mixture to below room temperature;
evacuating the container;
heating the container to room temperature;
reiterating the cooling and warming steps to remove degas the mixture;
adding a oxygen-sensitive initiator wherein the oxygen-sensitive initiator is selected from the group consisting of hydrazones dihydropyridines and mixtures thereof; and
reiterating the cooling, evacuating and warming steps to degas the mixture.

28. The process for making a one-component reactive adhesive product of claim 27, wherein:
The mixture comprises about 40 to about 80% by weight of radical-polymerizable monomers, about 1 to about 7% by weight of prepolymer termination groups selected from the group consisting of isocyanates, silanes and mixtures thereof and about 0.01 to about 40% by weight of additives, based on the adhesive as a whole; and
the oxygen sensitive initiator is present at about 1 to about 10% by weight.

29. The process of claim 27, wherein the product comprises:
about 50 parts by weight silane-terminated polytetrahydrofurfuryl diol;
about 50 parts by weight hydroxypropyl methacrylate;
about 4 parts by weight acetophenone-t-butyl hydrazone;
about 1.2 parts by weight Fe(acac)$_3$; and
about 750 ppm I$_2$.

* * * * *